July 21, 1931.  J. TAKAMINE, JR  1,815,279
PROCESS OF DEGUMMING SILK
Filed Nov. 29, 1927
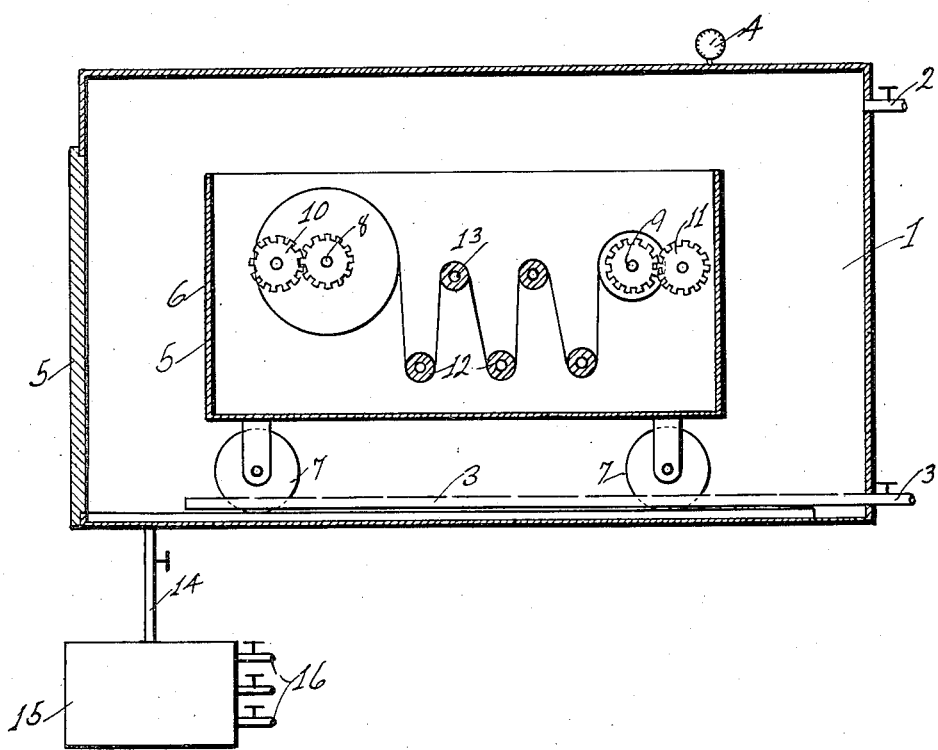
Jokichi Takamine, Jr  Inventor
By his Attorneys
Gifford & Scull Patented July 21, 1931

1,815,279

UNITED STATES PATENT OFFICE

JOKICHI TAKAMINE, JR., OF RIDGEWOOD, NEW JERSEY; HILDA TAKAMINE EXECUTRIX OF SAID JOKICHI TAKAMINE, JR., DECEASED, ASSIGNOR TO TAKAMINE FERMENT COMPANY, A CORPORATION OF WEST VIRGINIA

PROCESS OF DEGUMMING SILK

Application filed November 29, 1927. Serial No. 236,525.

This invention relates to a process for degumming or stripping silk, by which the gum or sericin is very thoroughly removed in a rapid and economical manner.

Silk that is used in commerce for making such materials as crepe, velvet, taffeta, etc., is woven from thread that usually consists of from 3 to 5 strands that are bound together by a gum that is ordinarily known as sericin. The individual strands may be obtained from different types of silk, such as European, Japanese, Chinese, Canton, Bengal, Tussah (Chinese wild silk), and Indian Tussah. Before the silk is dyed and bleached, whether in the skein or as woven material, it must first be degummed or stripped for the purpose of removing the sericin. Heretofore, the degumming has usually been accomplished by boiling the silk for about 45 minutes to 1½ hours in a neutral soap solution, such as Marseilles or olive oil soap. The amount of sericin in the silk is about 25% to 30% of the total weight of the silk, and it requires about 25 to 30% by weight of the soap to remove the sericin. Besides, it is sometimes necessary to subject the silk to a second soap bath treatment, or even a third treatment in order to remove the sericin to the desirable extent, after which the goods must be thoroughly rinsed. The former process of degumming silk has proven to be very expensive on account of the large amount of soap, time and labor required in the process.

By my invention silk, either in skeins or woven into cloth, is subjected to high temperatures and pressures in the presence of moisture, with agitation thereby saving a considerable amount of time and material. In carrying out the invention, I immerse the silk in water and move or agitate the same while subjecting it to a boiling temperature at a pressure considerably above atmospheric pressure. The agitation is important as it mechanically helps to remove the softened and loosened sericin. I then preferably wash the silk with water, and then treat it with about one-half of one per cent to one per cent of neutral soap in a water solution, preferably at a boiling temperature. After the soap treatment, the silk is washed in the degumming machine and may be subjected to the usual acid treatment, and is again washed with water.

The following is given as a specific example of carrying out the process, but it is to be understood that the time, pressure and proportions may be varied to some extent without departing from the spirit or scope of the invention: I place silk, either woven or in skeins, in a closed container, that is adapted to withstand the high pressures and is provided with means for agitating the contents. The silk is partially covered with water and heat is applied until the water boils and the pressure reaches about 50 pounds per square inch while the contents of silk is being moved or agitated. The temperature and agitation continue at this pressure for about 15 minutes when the water containing the removed sericin is run out to a settling tank and the silk is washed with fresh water. While a pressure of about 50 pounds per square inch has been found to be most suitable in the usual case, a pressure above approximately 35 pounds per square inch will operate with satisfactory results, although the time of treatment is somewhat longer than when the higher pressure is used.

If then desired, about one-half of one per cent of neutral soap in a water solution is introduced and heat and agitation are applied for about 15 minutes, after which the soap solution is removed and the silk washed again with water. Dilute acid may then be added in the well known way and the silk then washed with water and dried.

The invention can be conveniently carried out in an apparatus that is somewhat diagrammatically illustrated in the accompanying drawing. In the drawing reference character 1 indicates a tank or autoclave in which the silk may be degummed. The tank is provided with a valved pipe 2 through which water may be introduced into the tank, and with a valved steam pipe 3 through which steam may be introduced for heating and agitating the water. A pressure gauge 4 is provided for indicating the pressure and the tank can be closed so as to be air tight. A door 5 is provided at one side of the tank through which a portable frame 6 can be introduced.

The portable frame 6 carries mechanism for unwinding silk cloth from one spool and winding the same upon another spool to carry it through the water for degumming the same. The frame 6 may be provided with rollers 7 for convenience in moving the same into and out of the autoclave. Shafts 8 and 9 are mounted in the frame upon which shafts spools are placed for winding and unwinding the silk. The shafts may be driven by gears 10 and 11 in any convenient manner, preferably from a source outside of the tank. Idlers 12 and 13 are mounted in the frame so that the silk can be passed under and over the same, as indicated in the drawing. The spool of silk cloth is placed upon one of the shafts and threaded under and over the rollers 12 and 13 and the end is connected to the spool on the other shaft, and the driving mechanism is set in operation to unwind the silk from one spool and wind it upon the other. The driving mechanism is then reversed so as to pass the silk through the water again as many times as may be desired and at such a rate that the silk will be kept in the water for the desired length of time.

A valved outlet pipe 14 is provided at the bottom of the tank and leads to a settling tank 15 from which valved outlet pipes 16 lead at different heights.

It has been found that when silk is treated as above described, the sericin will be more completely removed, which is so important in preparing silk for tin weighting, than is the case with the old processes, and a very considerable amount of time, labor and material is thereby saved.

I claim:

1. The process of degumming silk which comprises heating and agitating in the presence of water at a pressure in excess of about 35 pounds per square inch.

2. The process of degumming silk which comprises submerging it in water and subjecting it to heat and pressure and treating it with about one-half of one per cent by weight of neutral soap in solution while agitating the silk.

3. The process of degumming silk which comprises submerging it in water and subjecting it to heat and pressure, washing it with water, and treating it with about one-half of one per cent by weight of neutral soap in solution while agitating the silk.

4. The process of degumming silk which comprises submerging it in water and subjecting it to heat and pressure and treating it with a small percentage by weight of neutral soap in solution while agitating the silk.

5. The process of degumming silk which comprises submerging it in water and subjecting it to heat at a pressure above approximately 50 pounds per square inch and treating it with about one-half of one per cent by weight of neutral soap in solution while agitating the silk.

6. The process of degumming silk which comprises submerging it in water and subjecting it to heat at a pressure above approximately 35 pounds per square inch for about a quarter of an hour and treating it with about one-half of one per cent by weight of neutral soap in solution while agitating the silk.

7. The process of degumming silk which comprises submerging it in water and subjecting it to heat at a pressure above approximately 35 pounds per square inch while agitating the same.

8. The process of degumming silk which comprises submerging it in water and subjecting it to heat and pressure while agitating it, washing it with water, and treating it with about one-half of one per cent by weight of neutral soap in solution.

JOKICHI TAKAMINE, Jr.